United States Patent
Maru et al.

(10) Patent No.: US 12,292,309 B2
(45) Date of Patent: May 6, 2025

(54) SENSITIVITY EQUALIZATION IN MULTI-SENSOR INDUCTIVE SENSING APPLICATIONS

(71) Applicant: Cirrus Logic International Semiconductor Ltd., Edinburgh (GB)

(72) Inventors: Siddharth Maru, Austin, TX (US); Josh Sanz-Robinson, Austin, TX (US); Tejasvi Das, Austin, TX (US); John L. Melanson, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 337 days.

(21) Appl. No.: 17/211,073

(22) Filed: Mar. 24, 2021

(65) Prior Publication Data
US 2022/0307872 A1    Sep. 29, 2022

(51) Int. Cl.
G01D 18/00    (2006.01)
G01D 5/20    (2006.01)

(52) U.S. Cl.
CPC .............. *G01D 18/00* (2013.01); *G01D 5/20* (2013.01)

(58) Field of Classification Search
CPC .................................. G01D 18/00; G01D 5/20
See application file for complete search history.

(56) References Cited

U.S. PATENT DOCUMENTS

| | | | | |
|---|---|---|---|---|
| 6,111,520 A | * | 8/2000 | Allen | G01D 5/48 340/447 |
| 9,176,165 B2 | * | 11/2015 | Quer | G01P 15/097 |
| 2012/0265037 A1 | * | 10/2012 | Bohm | G01N 33/49 600/309 |
| 2014/0278144 A1 | | 9/2014 | Risk et al. | |
| 2015/0331418 A1 | * | 11/2015 | Nogueira | G01D 18/00 702/104 |
| 2018/0183661 A1 | * | 6/2018 | Wouhaybi | H04L 67/12 |
| 2020/0064160 A1 | | 2/2020 | Maru et al. | |
| 2020/0133455 A1 | | 4/2020 | Sepehr et al. | |
| 2020/0364187 A1 | * | 11/2020 | Tran | H04W 64/00 |
| 2020/0382113 A1 | | 12/2020 | Beardsworth et al. | |

OTHER PUBLICATIONS

International Search Report and Written Opinion of the International Searching Authority, International Application No. PCT/US2022/018288, mailed May 27, 2022.

* cited by examiner

Primary Examiner — Akm Zakaria
(74) Attorney, Agent, or Firm — Jackson Walker L.L.P.

(57) ABSTRACT

A system may include a plurality of sensors configured to sense a physical quantity and a calibration subsystem configured to perform a calibration comprising: comparing a measured characteristic from each of at least two sensors of the plurality of sensors to determine a sensitivity drift of at least one sensor of the plurality of sensors; based on the measured characteristics of the at least two sensors and stored reference characteristics for the at least two sensors, calculating a normalization factor; and applying the normalization factor to the measured characteristic of the at least one sensor to ensure sensitivity of the plurality of sensors relative to each other remains approximately constant.

10 Claims, 7 Drawing Sheets

SENSITIVITY EQUALIZATION IN MULTI-SENSOR INDUCTIVE SENSING APPLICATIONS

FIELD OF DISCLOSURE

The present disclosure relates in general to electronic devices with user interfaces, (e.g., mobile devices, game controllers, instrument panels, etc.), and more particularly, resonant phase sensing of resistive-inductive-capacitive sensors for use in a system for mechanical button replacement in a mobile device, and/or other suitable applications.

BACKGROUND

Many traditional mobile devices (e.g., mobile phones, personal digital assistants, video game controllers, etc.) include mechanical buttons to allow for interaction between a user of a mobile device and the mobile device itself. However, such mechanical buttons are susceptible to aging, wear, and tear that may reduce the useful life of a mobile device and/or may require significant repair if malfunction occurs. Also, the presence of mechanical buttons may render it difficult to manufacture mobile devices to be waterproof. Accordingly, mobile device manufacturers are increasingly looking to equip mobile devices with virtual buttons that act as a human-machine interface allowing for interaction between a user of a mobile device and the mobile device itself. Similarly, mobile device manufacturers are increasingly looking to equip mobile devices with other virtual interface areas (e.g., a virtual slider, interface areas of a body of the mobile device other than a touch screen, etc.). Ideally, for best user experience, such virtual interface areas should look and feel to a user as if a mechanical button or other mechanical interface were present instead of a virtual button or virtual interface area.

Presently, linear resonant actuators (LRAs) and other vibrational actuators (e.g., rotational actuators, vibrating motors, etc.) are increasingly being used in mobile devices to generate vibrational feedback in response to user interaction with human-machine interfaces of such devices. Typically, a sensor (traditionally a force or pressure sensor) detects user interaction with the device (e.g., a finger press on a virtual button of the device) and in response thereto, the linear resonant actuator may vibrate to provide feedback to the user. For example, a linear resonant actuator may vibrate in response to user interaction with the human-machine interface to mimic to the user the feel of a mechanical button click.

However, there is a need in the industry for sensors to detect user interaction with a human-machine interface, wherein such sensors provide acceptable levels of sensor sensitivity, power consumption, dynamic range, and size.

SUMMARY

In accordance with the teachings of the present disclosure, the disadvantages and problems associated with sensing of human-machine interface interactions in a mobile device may be reduced or eliminated.

In accordance with embodiments of the present disclosure, a system may include a plurality of sensors configured to sense a physical quantity and a calibration subsystem configured to perform a calibration comprising: comparing a measured characteristic from each of at least two sensors of the plurality of sensors to determine a sensitivity drift of at least one sensor of the plurality of sensors; based on the measured characteristics of the at least two sensors and stored reference characteristics for the at least two sensors, calculating a normalization factor; and applying the normalization factor to the measured characteristic of the at least one sensor to ensure sensitivity of the plurality of sensors relative to each other remains approximately constant.

In accordance with these and other embodiments of the present disclosure, a method for performing a calibration in a system having a plurality of sensors configured to sense a physical quantity may include comparing a measured characteristic from each of at least two sensors of the plurality of sensors to determine a sensitivity drift of at least one sensor of the plurality of sensors, based on the measured characteristics of the at least two sensors and stored reference characteristics for the at least two sensors, calculating a normalization factor, and applying the normalization factor to the measured characteristic of the at least one sensor to ensure sensitivity of the plurality of sensors relative to each other remains approximately constant.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates selected components of an inductive sensing system that may be implemented by a resonant phase sensing system, in accordance with embodiments of the present disclosure;

Each of FIGS. 4A-4C illustrates a diagram of selected components of an example resonant phase sensing system, in accordance with embodiments of the present disclosure;

DETAILED DESCRIPTION

Figure 1:
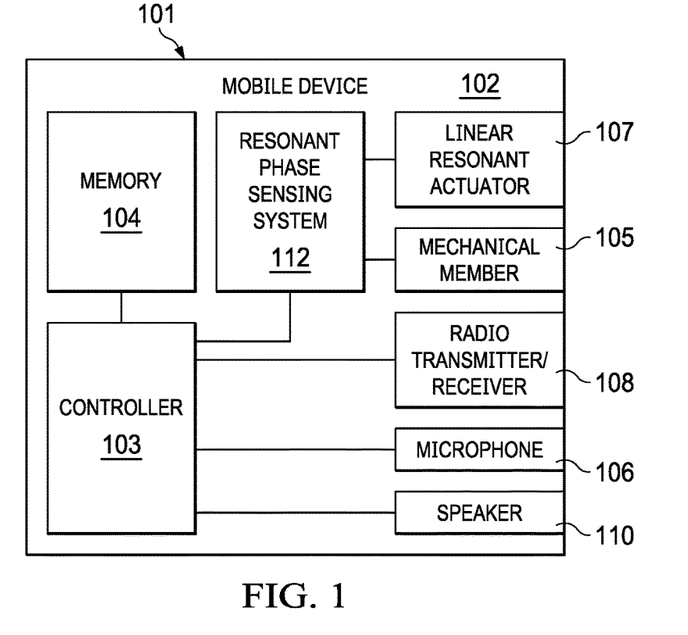
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, a controller 103, a memory 104, a mechanical member 105, a microphone 106, a linear resonant actuator 107, a radio transmitter/receiver 108, a speaker 110, and a resonant phase sensing system 112.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Controller 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, controller 103 may interpret and/or execute program instructions and/or process data stored in memory 104 and/or other computer-readable media accessible to controller 103.

Memory 104 may be housed within enclosure 101, may be communicatively coupled to controller 103, and may include any system, device, or apparatus configured to retain program instructions and/or data for a period of time (e.g., computer-readable media). Memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Microphone 106 may be housed at least partially within enclosure 101, may be communicatively coupled to controller 103, and may comprise any system, device, or apparatus configured to convert sound incident at microphone 106 to an electrical signal that may be processed by controller 103, wherein such sound is converted to an electrical signal using a diaphragm or membrane having an electrical capacitance that varies based on sonic vibrations received at the diaphragm or membrane. Microphone 106 may include an electrostatic microphone, a condenser microphone, an electret microphone, a microelectromechanical systems (MEMS) microphone, or any other suitable capacitive microphone.

Radio transmitter/receiver 108 may be housed within enclosure 101, may be communicatively coupled to controller 103, and may include any system, device, or apparatus configured to, with the aid of an antenna, generate and transmit radio-frequency signals as well as receive radio-frequency signals and convert the information carried by such received signals into a form usable by controller 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to controller 103, and may comprise any system, device, or apparatus configured to produce sound in response to electrical audio signal input. In some embodiments, speaker 110 may comprise a dynamic loudspeaker, which employs a lightweight diaphragm mechanically coupled to a rigid frame via a flexible suspension that constrains a voice coil to move axially through a cylindrical magnetic gap. When an electrical signal is applied to the voice coil, a magnetic field is created by the electric current in the voice coil, making it a variable electromagnet. The voice coil and the driver's magnetic system interact, generating a mechanical force that causes the voice coil (and thus, the attached cone) to move back and forth, thereby reproducing sound under the control of the applied electrical signal coming from the amplifier.

Mechanical member 105 may be housed within or upon enclosure 101, and may include any suitable system, device, or apparatus configured such that all or a portion of mechanical member 105 displaces in position responsive to a force, a pressure, or a touch applied upon or proximately to mechanical member 105. In some embodiments, mechanical member 105 may be designed to appear as a mechanical button on the exterior of enclosure 101.

Linear resonant actuator 107 may be housed within enclosure 101, and may include any suitable system, device, or apparatus for producing an oscillating mechanical force across a single axis. For example, in some embodiments, linear resonant actuator 107 may rely on an alternating current voltage to drive a voice coil pressed against a moving mass connected to a spring. When the voice coil is driven at the resonant frequency of the spring, linear resonant actuator 107 may vibrate with a perceptible force. Thus, linear resonant actuator 107 may be useful in haptic applications within a specific frequency range. While, for the purposes of clarity and exposition, this disclosure is described in relation to the use of linear resonant actuator 107, it is understood that any other type or types of vibrational actuators (e.g., eccentric rotating mass actuators) may be used in lieu of or in addition to linear resonant actuator 107. In addition, it is also understood that actuators arranged to produce an oscillating mechanical force across multiple axes may be used in lieu of or in addition to linear resonant actuator 107. As described elsewhere in this disclosure, a linear resonant actuator 107, based on a signal received from resonant phase sensing system 112, may render haptic feedback to a user of mobile device 102 for at least one of mechanical button replacement and capacitive sensor feedback.

Together, mechanical member 105 and linear resonant actuator 107 may form a human-interface device, such as a virtual interface (e.g., a virtual button), which, to a user of mobile device 102, has a look and feel of a mechanical button or other mechanical interface of mobile device 102.

Resonant phase sensing system 112 may be housed within enclosure 101, may be communicatively coupled to mechanical member 105 and linear resonant actuator 107, and may include any system, device, or apparatus configured to detect a displacement of mechanical member 105 indicative of a physical interaction (e.g., by a user of mobile device 102) with the human-machine interface of mobile device 102 (e.g., a force applied by a human finger to a virtual interface of mobile device 102). As described in greater detail below, resonant phase sensing system 112 may detect displacement of mechanical member 105 by performing resonant phase sensing of a resistive-inductive-capacitive sensor for which an impedance (e.g., inductance, capacitance, and/or resistance) of the resistive-inductive-capacitive sensor changes in response to displacement of mechanical member 105. Thus, mechanical member 105 may comprise any suitable system, device, or apparatus which all or a portion thereof may displace, and such displacement may cause a change in an impedance of a resistive-inductive-capacitive sensor integral to resonant phase sensing system 112. Resonant phase sensing system 112 may also generate an electronic signal for driving linear resonant actuator 107 in response to a physical interaction associated with a human-machine interface associated with mechanical member 105. Detail of an example resonant phase sensing system 112 in accordance with embodiments of the present disclosure is depicted in greater detail below.

Although specific example components are depicted in FIG. 1 as being integral to mobile device 102 (e.g., controller 103, memory 104, mechanical member 105, microphone 106, radio transmitter/receiver 108, speakers(s) 110, linear resonant actuator 107, etc.), a mobile device 102 in accordance with this disclosure may comprise one or more components not specifically enumerated above. For example, although FIG. 1 depicts certain user interface components, mobile device 102 may include one or more other user interface components in addition to those depicted in FIG. 1, including but not limited to a keypad, a touch screen, and a display, thus allowing a user to interact with and/or otherwise manipulate mobile device 102 and its associated components. In addition, although FIG. 1 depicts only a single virtual button comprising mechanical member 105 and linear resonant actuator 107 for purposes of clarity and exposition, in some embodiments a mobile device 102 may have multiple virtual interfaces each comprising a respective mechanical member 105 and linear resonant actuator 107.

Although, as stated above, resonant phase sensing system 112 may detect displacement of mechanical member 105 by performing resonant phase sensing of a resistive-inductive-capacitive sensor for which an impedance (e.g., inductance, capacitance, and/or resistance) of the resistive-inductive-capacitive sensor changes in response to displacement of mechanical member 105, in some embodiments, resonant phase sensing system 112 may primarily detect displacement of mechanical member 105 by using resonant phase sensing to determine a change in an inductance of a resistive-inductive-capacitive sensor. For example, FIGS. 2 and 3 illustrate selected components of an example inductive sensing application that may be implemented by resonant phase sensing system 112, in accordance with embodiments of the present disclosure.

Figure 2:
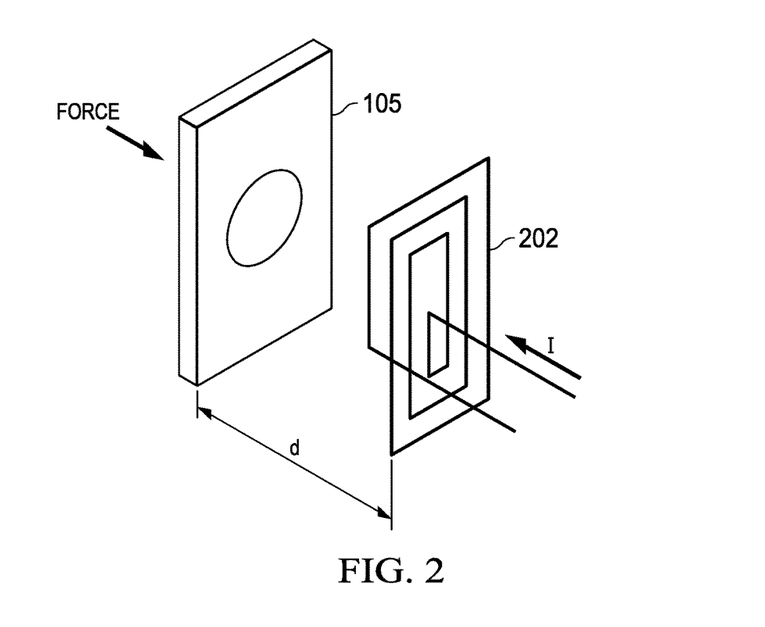
FIG. 2 illustrates a mechanical member separated by a distance from an inductive coil, in accordance with embodiments of the present disclosure.

FIG. 2 illustrates mechanical member 105 embodied as a metal plate separated by a distance d from an inductive coil 202, in accordance with embodiments of the present disclosure. FIG. 3 illustrates selected components of an inductive sensing system 300 that may be implemented by resonant phase sensing system 112, in accordance with embodiments of the present disclosure. As shown in FIG. 3, inductive sensing system 300 may include mechanical member 105, modeled as a variable electrical resistance 304 and a variable electrical inductance 306, and may include inductive coil 202 in physical proximity to mechanical member 105 such that inductive coil 202 has a mutual inductance with mechanical member 105 defined by a variable coupling coefficient k. As shown in FIG. 3, inductive coil 202 may be modeled as a variable electrical inductance 308 and a variable electrical resistance 310.

In operation, as a current I flows through inductive coil 202, such current may induce a magnetic field which in turn may induce an eddy current inside mechanical member 105. When a force is applied to and/or removed from mechanical member 105, which alters distance d between mechanical member 105 and inductive coil 202, the coupling coefficient k, variable electrical resistance 304, and/or variable electrical inductance 306 may also change in response to the change in distance. These changes in the various electrical parameters may, in turn, modify an effective impedance $Z_L$ of inductive coil 202.

Figures 3, 4A:
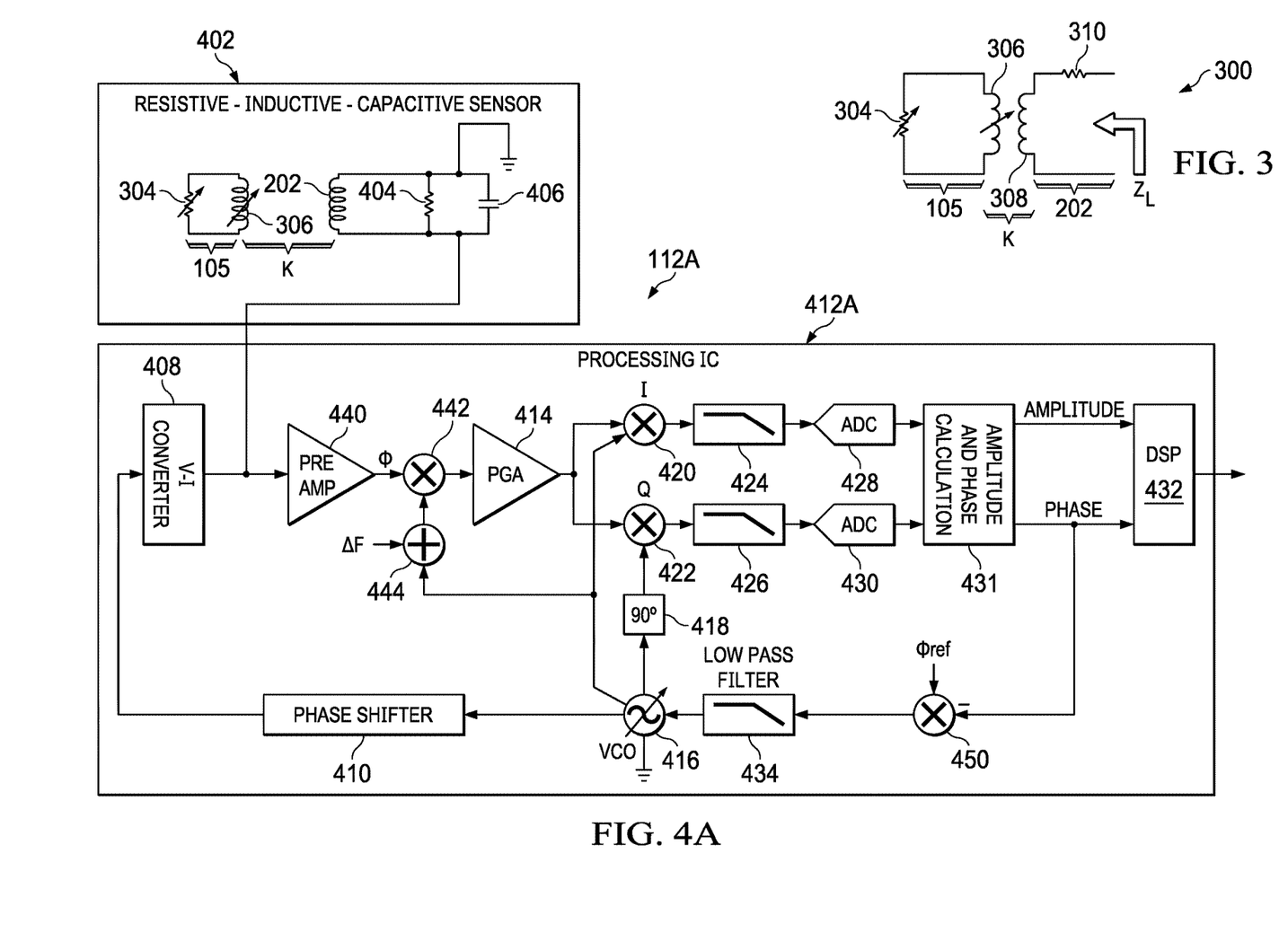

FIG. 4A illustrates a diagram of selected components of an example resonant phase sensing system 112A, in accordance with embodiments of the present disclosure. In some embodiments, resonant phase sensing system 112A may be used to implement resonant phase sensing system 112 of FIG. 1. As shown in FIG. 4A, resonant phase sensing system 112A may include a resistive-inductive-capacitive sensor 402 and a processing integrated circuit (IC) 412A.

As shown in FIG. 4A, resistive-inductive-capacitive sensor 402 may include mechanical member 105, inductive coil 202, a resistor 404, and capacitor 406, wherein mechanical member 105 and inductive coil 202 have a variable coupling coefficient k. Although shown in FIG. 4A to be arranged in parallel with one another, it is understood that inductive coil 202, resistor 404, and capacitor 406 may be arranged in any other suitable manner that allows resistive-inductive-capacitive sensor 402 to act as a resonant tank. For example, in some embodiments, inductive coil 202, resistor 404, and capacitor 406 may be arranged in series with one another. In some embodiments, resistor 404 may not be implemented with a stand-alone resistor, but may instead be implemented by a parasitic resistance of inductive coil 202, a parasitic resistance of capacitor 406, and/or any other suitable parasitic resistance.

Processing IC 412A may be communicatively coupled to resistive-inductive-capacitive sensor 402 and may comprise any suitable system, device, or apparatus configured to implement a measurement circuit to measure phase information associated with resistive-inductive-capacitive sensor 402 and based on the phase information, determine a displacement of mechanical member 105 relative to resistive-inductive-capacitive sensor 402. Thus, processing IC 412A may be configured to determine an occurrence of a physical interaction (e.g., press or release of a virtual button) associated with a human-machine interface associated with mechanical member 105 based on the phase information.

As shown in FIG. 4A, processing IC 412A may include a phase shifter 410, a voltage-to-current converter 408, a preamplifier 440, an intermediate frequency mixer 442, a combiner 444, a programmable gain amplifier (PGA) 414, a voltage-controlled oscillator (VCO) 416, a phase shifter 418, an amplitude and phase calculation block 431, a DSP 432, a low-pass filter 434, and a combiner 450. Processing IC 412A may also include a coherent incident/quadrature detector implemented with an incident channel comprising a mixer 420, a low-pass filter 424, and an analog-to-digital converter (ADC) 428, and a quadrature channel comprising a mixer 422, a low-pass filter 426, and an ADC 430 such that processing IC 412A is configured to measure the phase information using the coherent incident/quadrature detector.

Phase shifter 410 may include any system, device, or apparatus configured to detect an oscillation signal generated by processing IC 412A (as explained in greater detail below) and phase shift such oscillation signal (e.g., by 45 degrees) such that a normal operating frequency of resonant phase sensing system 112A, an incident component of a sensor signal φ generated by pre-amplifier 440, is approximately equal to a quadrature component of sensor signal φ, so as to provide common mode noise rejection by a phase detector implemented by processing IC 412A, as described in greater detail below.

Voltage-to-current converter 408 may receive the phase shifted oscillation signal from phase shifter 410, which may be a voltage signal, convert the voltage signal to a corresponding current signal, and drive the current signal on resistive-inductive-capacitive sensor 402 at a driving frequency with the phase-shifted oscillation signal in order to generate sensor signal φ which may be processed by processing IC 412A, as described in greater detail below. In some embodiments, a driving frequency of the phase-shifted oscillation signal may be selected based on a resonant frequency of resistive-inductive-capacitive sensor 402 (e.g., may be approximately equal to the resonant frequency of resistive-inductive-capacitive sensor 402).

Preamplifier 440 may receive sensor signal φ and condition sensor signal φ for frequency mixing, with mixer 442, to an intermediate frequency Δf combined by combiner 444 with an oscillation frequency generated by VCO 416, as described in greater detail below, wherein intermediate frequency Δf is significantly less than the oscillation frequency. In some embodiments, preamplifier 440, mixer 442, and combiner 444 may not be present, in which case PGA 414 may receive sensor signal φ directly from resistive-inductive-capacitive sensor 402. However, when present, preamplifier 440, mixer 442, and combiner 444 may allow for mixing sensor signal φ down to a lower intermediate frequency Δf which may allow for lower-bandwidth and more efficient ADCs (e.g., ADCs 428 and 430 of FIGS. 4A and 4B and ADC 429 of FIG. 4C, described below) and/or which may allow for minimization of phase and/or gain mismatches in the incident and quadrature paths of the phase detector of processing IC 412A.

In operation, PGA 414 may further amplify sensor signal φ to condition sensor signal φ for processing by the coherent incident/quadrature detector. VCO 416 may generate an oscillation signal to be used as a basis for the signal driven by voltage-to-current converter 408, as well as the oscillation signals used by mixers 420 and 422 to extract incident and quadrature components of amplified sensor signal φ. As shown in FIG. 4A, mixer 420 of the incident channel may use an unshifted version of the oscillation signal generated by VCO 416, while mixer 422 of the quadrature channel may use a 90-degree shifted version of the oscillation signal phase shifted by phase shifter 418. As mentioned above, the oscillation frequency of the oscillation signal generated by VCO 416 may be selected based on a resonant frequency of resistive-inductive-capacitive sensor 402 (e.g., may be approximately equal to the resonant frequency of resistive-inductive-capacitive sensor 402).

In the incident channel, mixer 420 may extract the incident component of amplified sensor signal φ, low-pass filter 424 may filter out the oscillation signal mixed with the amplified sensor signal φ to generate a direct current (DC) incident component, and ADC 428 may convert such DC incident component into an equivalent incident component digital signal for processing by amplitude and phase calculation block 431. Similarly, in the quadrature channel, mixer 422 may extract the quadrature component of amplified sensor signal φ, low-pass filter 426 may filter out the phase-shifted oscillation signal mixed with the amplified sensor signal φ to generate a direct current (DC) quadrature component, and ADC 430 may convert such DC quadrature component into an equivalent quadrature component digital signal for processing by amplitude and phase calculation block 431.

Amplitude and phase calculation block 431 may include any system, device, or apparatus configured to receive phase information comprising the incident component digital signal and the quadrature component digital signal and based thereon, extract amplitude and phase information.

DSP 432 may include any system, device, or apparatus configured to interpret and/or execute program instructions and/or process data. In particular, DSP 432 may receive the phase information and the amplitude information generated by amplitude and phase calculation block 431 and based thereon, determine a displacement of mechanical member 105 relative to resistive-inductive-capacitive sensor 402, which may be indicative of an occurrence of a physical interaction (e.g., press or release of a virtual button or other interaction with a virtual interface) associated with a human-machine interface associated with mechanical member 105 based on the phase information. DSP 432 may also generate an output signal indicative of the displacement. In some embodiments, such output signal may comprise a control signal for controlling mechanical vibration of linear resonant actuator 107 in response to the displacement.

The phase information generated by amplitude and phase calculation block 431 may be subtracted from a reference phase $\phi_{ref}$ by combiner 450 in order to generate an error signal that may be received by low-pass filter 434. Low-pass filter 434 may low-pass filter the error signal, and such filtered error signal may be applied to VCO 416 to modify the frequency of the oscillation signal generated by VCO 416, in order to drive sensor signal φ towards reference phase $\phi_{ref}$. As a result, sensor signal φ may comprise a transient decaying signal in response to a "press" of a virtual button (or other interaction with a virtual interface) associated with resonant phase sensing system 112A as well as another transient decaying signal in response to a subsequent "release" of the virtual button (or other interaction with a virtual interface). Accordingly, low-pass filter 434 in connection with VCO 416 may implement a feedback control loop that may track changes in operating parameters of resonant phase sensing system 112A by modifying the driving frequency of VCO 416.

Figure 4B:
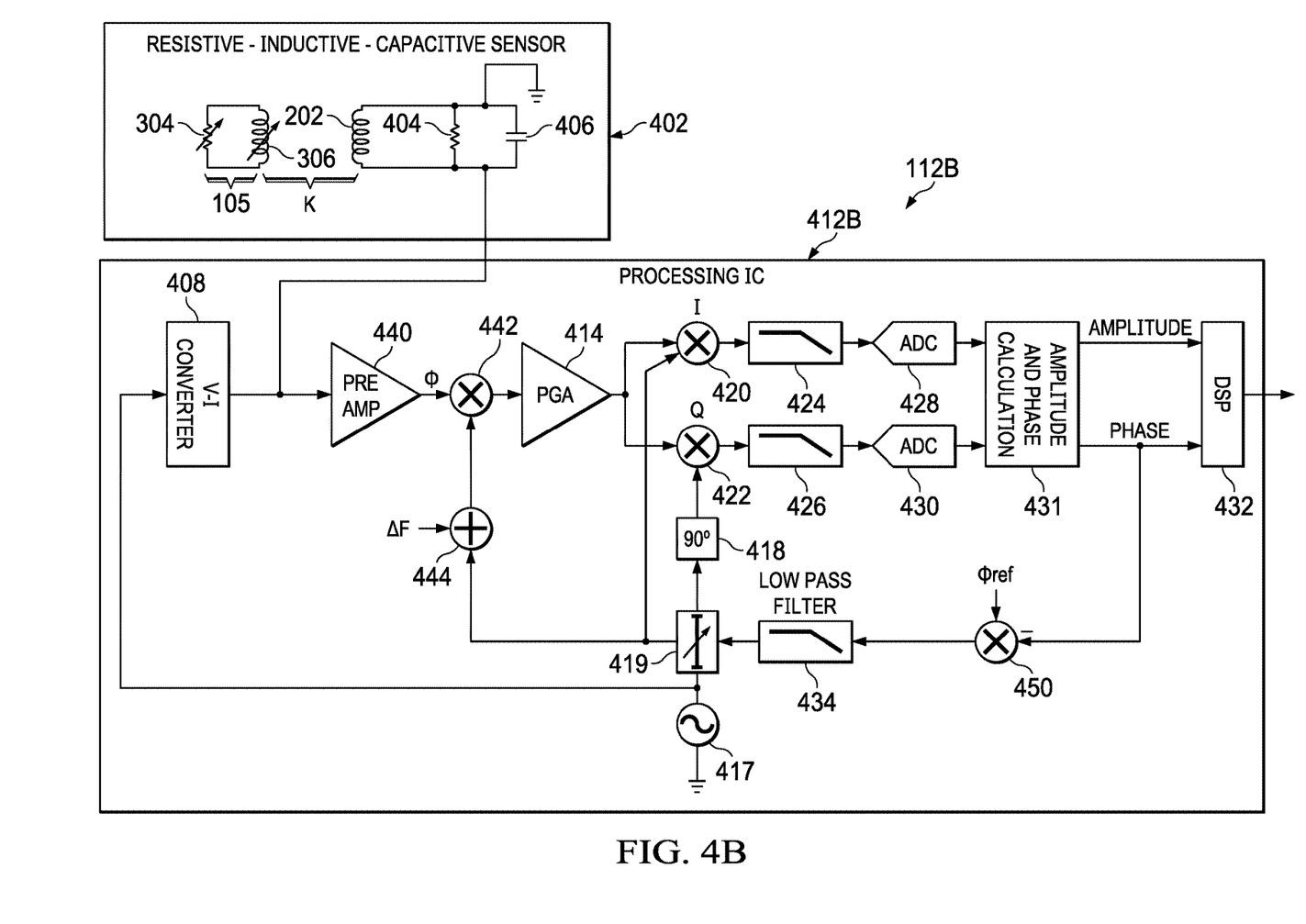

FIG. 4B illustrates a diagram of selected components of an example resonant phase sensing system 112B, in accordance with embodiments of the present disclosure. In some embodiments, resonant phase sensing system 112B may be used to implement resonant phase sensing system 112 of FIG. 1. Resonant phase sensing system 112B of FIG. 4B may be, in many respects, similar to resonant phase sensing system 112A of FIG. 4A. Accordingly, only those differences between resonant phase sensing system 112B and resonant phase sensing system 112A may be described below. As shown in FIG. 4B, resonant phase sensing system 112B may include processing IC 412B in lieu of processing IC 412A. Processing IC 412B of FIG. 4B may be, in many respects, similar to processing IC 412A of FIG. 4A. Accordingly, only those differences between processing IC 412B and processing IC 412A may be described below.

Processing IC 412B may include fixed-frequency oscillator 417 and variable phase shifter 419 in lieu of VCO 416 of processing IC 412A. Thus, in operation, oscillator 417 may drive a fixed driving signal and oscillation signal which variable phase shifter 419 may phase shift to generate oscillation signals to be mixed by mixers 420 and 422. Similar to that of processing IC 412A, low-pass filter 434 may low-pass filter an error signal based on phase information extracted by amplitude and phase calculation block 431, but instead such filtered error signal may be applied to variable phase shifter 419 to modify the phase offset of the oscillation signal generated by oscillator 417, in order to drive sensor signal ϕ towards indicating a phase shift of zero. As a result, sensor signal ϕ may comprise a transient decaying signal in response to a "press" of a virtual button (or other interaction with a virtual interface) associated with resonant phase sensing system 112B as well as another transient decaying signal in response to a subsequent "release" of the virtual button (or other interaction with a virtual interface). Accordingly, low-pass filter 434 in connection with variable phase shifter 419 may implement a feedback control loop that may track changes in operating parameters of resonant phase sensing system 112B by modifying the phase shift applied by variable phase shifter 419.

Figure 4C:
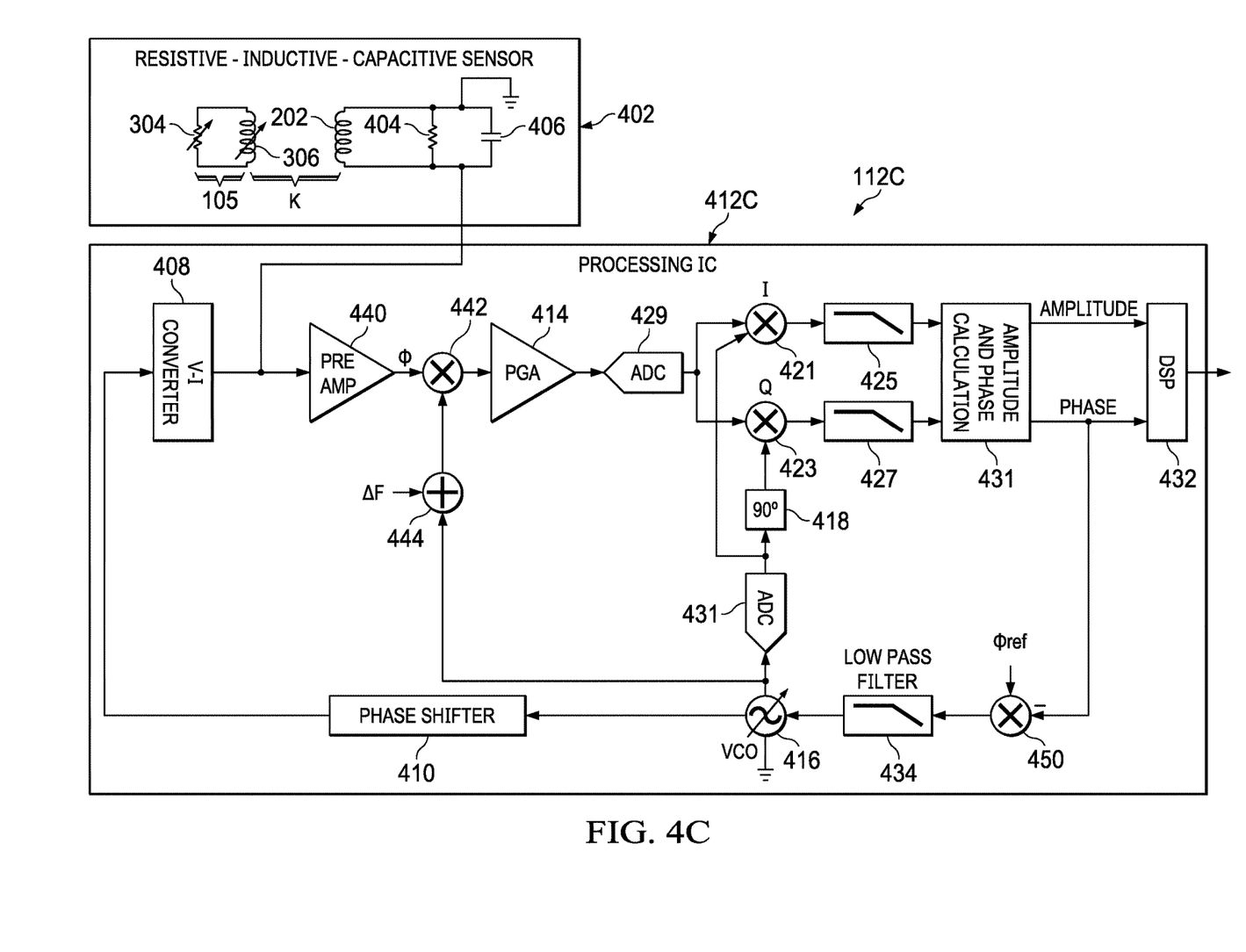

FIG. 4C illustrates a diagram of selected components of an example resonant phase sensing system 112C, in accordance with embodiments of the present disclosure. In some embodiments, resonant phase sensing system 112C may be used to implement resonant phase sensing system 112 of FIG. 1. Resonant phase sensing system 112C of FIG. 4C may be, in many respects, similar to resonant phase sensing system 112A of FIG. 4A. Accordingly, only those differences between resonant phase sensing system 112C and resonant phase sensing system 112A may be described below. For example, a particular difference between resonant phase sensing system 112C and resonant phase sensing system 112A is that resonant phase sensing system 112C may include ADC 429 in lieu of ADC 428 and ADC 430. Accordingly, a coherent incident/quadrature detector for resonant phase sensing system 112C may be implemented with an incident channel comprising a digital mixer 421 and a digital low-pass filter 425 (in lieu of analog mixer 420 and analog low-pass filter 424) and a quadrature channel comprising a digital mixer 423 and a low-pass filter 427 (in lieu of analog mixer 422 and analog low-pass filter 426) such that processing IC 412C is configured to measure the phase information using such coherent incident/quadrature detector. Although not explicitly shown, resonant phase sensing system 112B could be modified in a manner similar to that of how resonant phase sensing system 112A is shown to be modified to result in resonant phase sensing system 112C.

Figure 5:
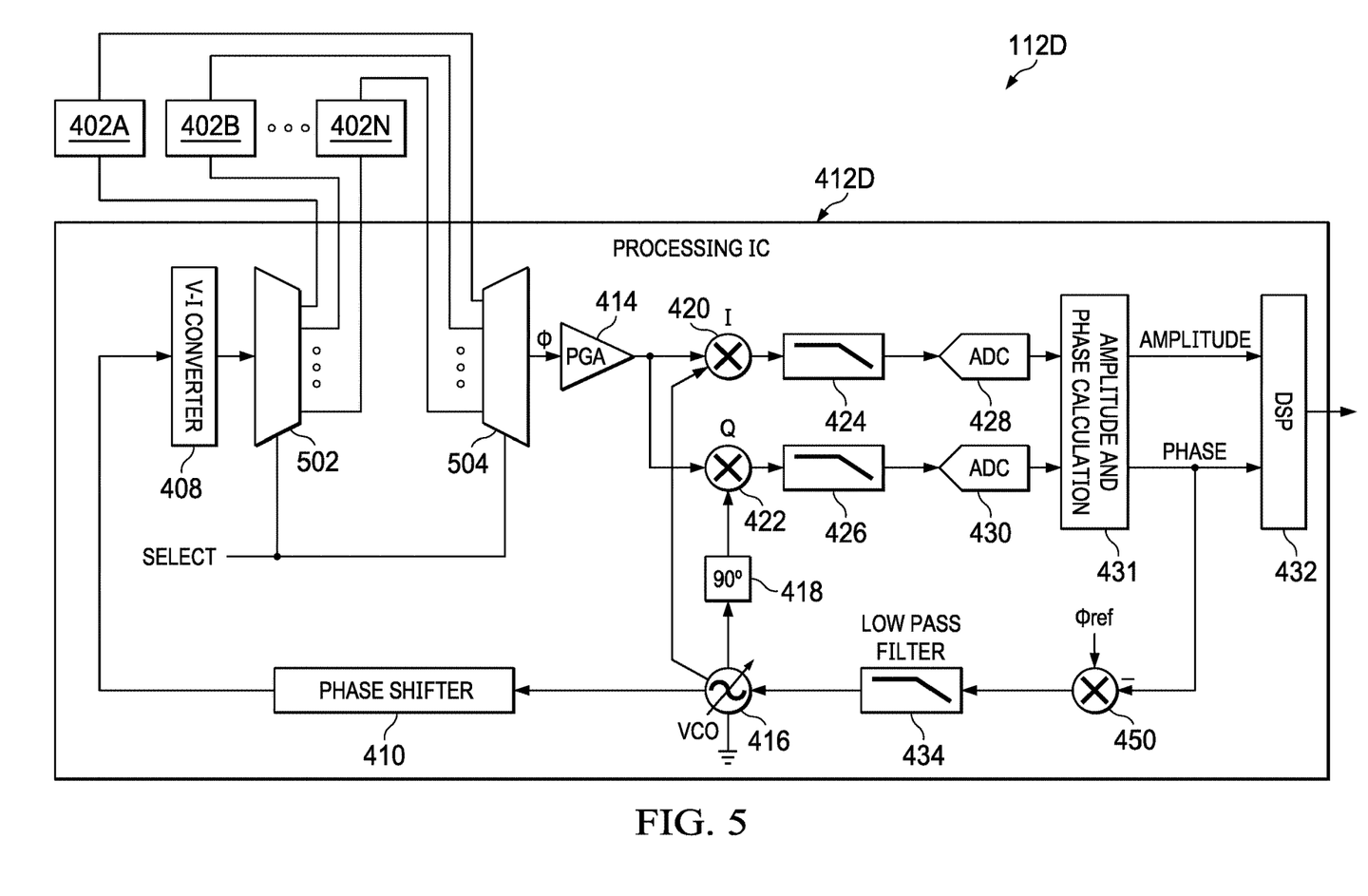
FIG. 5 illustrates a diagram of selected components of an example resonant phase sensing system implementing time-division multiplexed processing of multiple resistive-inductive-capacitive sensors, in accordance with embodiments of the present disclosure.

FIG. 5 illustrates a diagram of selected components of an example resonant phase sensing system 112D implementing time-division multiplexed processing of multiple resistive-inductive-capacitive sensors 402 (e.g., resistive-inductive-capacitive sensors 402A-402N shown in FIG. 5), in accordance with embodiments of the present disclosure. In some embodiments, resonant phase sensing system 112D may be used to implement resonant phase sensing system 112 of FIG. 1. Resonant phase sensing system 112D of FIG. 5 may be, in many respects, similar to resonant phase sensing system 112A of FIG. 4A. Accordingly, only those differences between resonant phase sensing system 112D and resonant phase sensing system 112A may be described below. In particular, resonant phase sensing system 112D may include a plurality of resistive-inductive-capacitive sensors 402 (e.g., resistive-inductive-capacitive sensors 402A-402N shown in FIG. 5) in lieu of the single resistive-inductive-capacitive sensor 402 shown in FIG. 4A. In addition, resonant phase sensing system 112D may include multiplexers 502 and 504, each of which may select an output signal from a plurality of input signals responsive to a control signal SELECT (which may be controlled by a time-division multiplexing control subsystem implemented by controller 103 or another suitable component of mobile device 102). Thus, while in some embodiments a device such as mobile device 102 may comprise a plurality of resistive-inductive-capacitive sensors 402 which may be simultaneously driven and separately processed by a respective processing IC, in other embodiments a resonant phase sensing system (e.g., resonant phase sensing system 112D) may drive resistive-inductive-capacitive sensors 402 in a time-division multiplexed manner Such approach may reduce power consumption and device size as compared with multiple-sensor implementations in which the multiple sensors are simultaneously driven and/or sensed. Device size may be reduced by time-division multiplexing multiple sensors into a single driver and measurement circuit channel, wherein only a single driver and a single measurement circuit may be required, thus minimizing an amount of integrated circuit area needed to perform driving and measurement. In addition, by leveraging a single driver and measurement circuit, no calibration may be needed to adjust for mismatches and/or errors between different drivers and/or different measurement circuits.

For purposes of clarity and exposition, preamplifier 440, mixer 442, and combiner 444 have been excluded from FIG. 5. However, in some embodiments, processing IC 412D may include preamplifier 440, mixer 442, and combiner 444 similar to that depicted in FIGS. 4A-4C.

In resonant phase sensing system 112D, when a first resistive-inductive-capacitive sensor (e.g., resistive-inductive-capacitive sensor 402A) is selected by the time-division multiplexing control subsystem for being driven by voltage-to-current converter 408 and measured by the measurement circuit implemented by processing IC 412A, other resistive-inductive-capacitive sensors (e.g., resistive-inductive-capacitive sensors 402B-402N) may each be placed in a low-impedance state. Similarly, when a second resistive-inductive-capacitive sensor (e.g., resistive-inductive-capacitive sensor 402B) is selected by the time-division multiplexing control subsystem for being driven by voltage-to-current converter 408 and measured by the measurement circuit implemented by processing IC 412A, other resistive-inductive-capacitive sensors (e.g., resistive-inductive-capacitive sensors other than 402B, including 402A) may each be placed in a low-impedance state. Such an approach may minimize power consumption within unselected resistive-inductive-capacitive sensors 402.

Although not explicitly shown, resonant phase sensing system 112B could be modified in a manner similar to that of how resonant phase sensing system 112A is shown to be modified to result in resonant phase sensing system 112D, such that resonant phase sensing system 112B could implement time-division multiplexed sensing on a plurality of resistive-inductive-capacitive sensors 402. Similarly, although not explicitly shown, resonant phase sensing system 112C could be modified in a manner similar to that of how resonant phase sensing system 112A is shown to be modified to result in resonant phase sensing system 112D, such that resonant phase sensing system 112C could implement time-division multiplexed sensing on a plurality of resistive-inductive-capacitive sensors 402.

In a multi-sensor implementation such as shown in FIG. 5, outputs of two or more inductive sensors placed under a deflecting metal surface could be used to infer location of a force applied on the metal surface. A gain (or transfer function) of each sensor channel may typically be adjusted apriori based on known relative location of the sensor and characteristics (e.g., sensitivity). If a relative sensitivity between sensors were to drift over time, an estimated position may also drift. In other words, a larger the drift in sensor characteristics, the larger the error in estimated position may be. Thus, to ensure position sensing that is not affected by sensor drift, a relative drift in sensor characteristics must be detected and an appropriate correction must be applied to the gain (or transfer function) of each sensor channel.

Existing approaches to sensor drift may include measuring and cancelling a drift in quality factor for each sensor, and normalizing a measured phase for each sensor. However, such an approach may have many limitations. For example, in multi-sensor applications, sensitivity may drift until correction occurs, and any error in estimation may add up across multiple sensors, increasing a perceived error. Further, both a drift in phase detection circuitry or a drift in sensor quality factor could cause a change in measured phase and amplitude, and such drifts may be difficult to separate from one another. In addition, estimating a quality factor may require probing a sensor multiple times to derive sensor characteristics, which may require significant power. Also, measurement noise may introduce errors in an estimated quality factor, making normalization inaccurate. Such errors can be reduced by averaging multiple measurements, but at the expense of power consumption.

To overcome these limitations, DSP 432 (or other hardware) of processing IC 412D may be configured to perform sensitivity equalization among sensors, as described in greater detail below.

Figure 6:
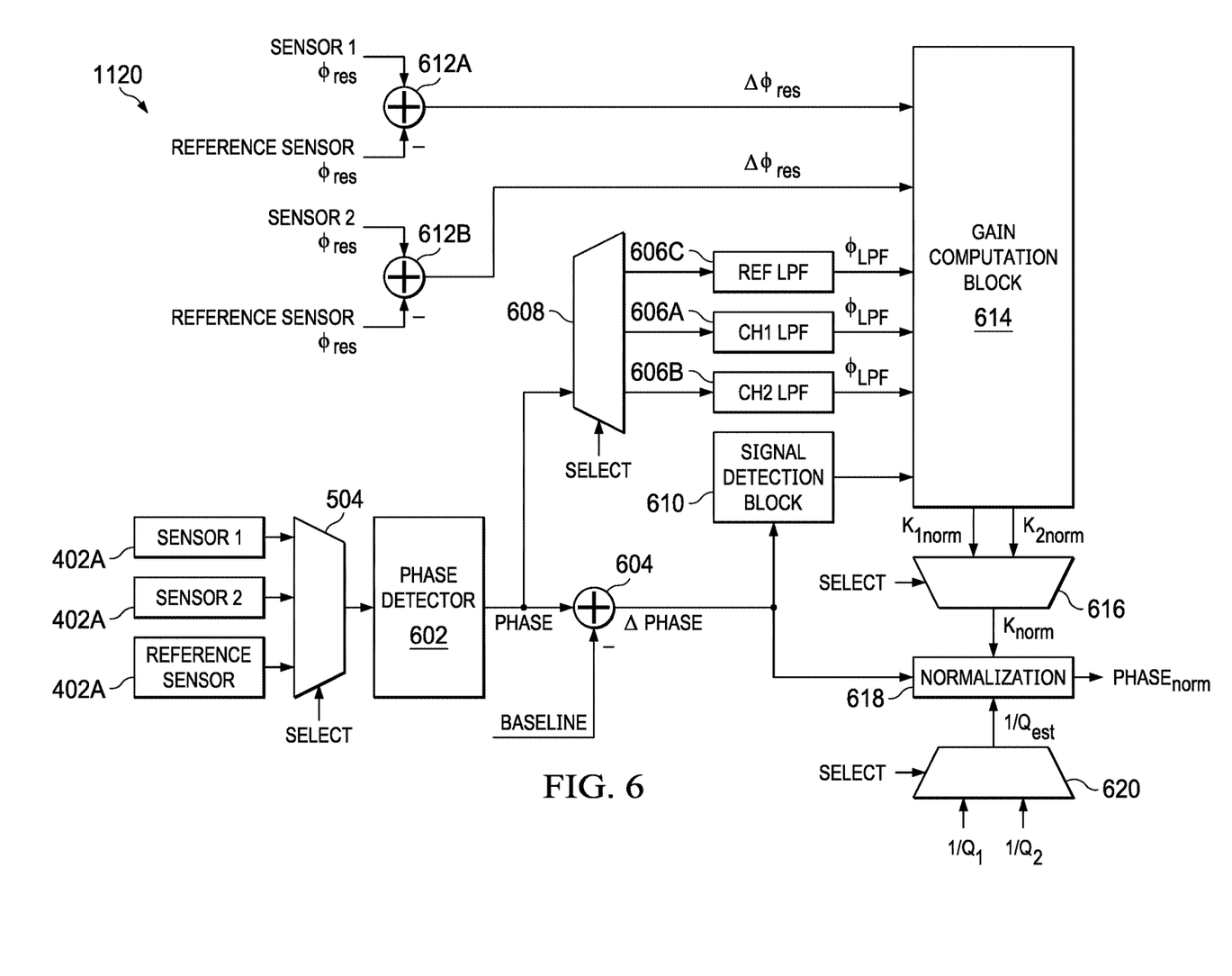
FIG. 6 illustrates a different diagram of selected components of an example resonant phase sensing system shown in FIG. 5, in accordance with embodiments of the present disclosure.

FIG. 6 illustrates a different diagram of selected components of example resonant phase sensing system 112D with different detail than that shown in FIG. 5, in accordance with embodiments of the present disclosure. As shown in FIG. 6, resonant phase sensing system 112D may include a first-channel sensor 402A, a second-channel sensor 402B, and a reference sensor 402C. Although FIG. 6 depicts only three sensors 402 for clarity and exposition, any suitable number of resistive-inductive-capacitive sensors 402 may be used. In operation, first-channel sensor 402A and second-channel sensor 402B may comprise position-estimation sensors, while reference sensor 402C is used as a reference for sensitivity equalization.

The various outputs of sensors 402 may be multiplexed by multiplexer 504, based on selection signal SELECT to a phase detector 602, which may be implemented by various components of processing IC 412D, including without limitation PGA 414, mixers 420 and 422, low-pass filters 424 and 426, ADCs 428 and 430, and amplitude and phase calculation block 431. As in FIG. 5, phase detector 602 may generate a raw phase signal PHASE for the sensor channel selected by multiplexer 504.

A combiner 604, which may be implemented by DSP 432 or other hardware of a processing IC 412, may subtract a baseline phase BASELINE from raw phase signal PHASE to generate a phase change signal ΔPHASE. A change in raw phase signal PHASE, and indicated by phase change signal ΔPHASE having a non-zero value, may indicate (in the absence of drift) human interaction or other force placed upon a mechanical member 105 proximate to a sensor 402.

A plurality of low-pass filters 606 (e.g., one for each respective sensor 402) may be implemented by DSP 432 or other hardware of a processing IC 412 and each low-pass filter 606 may filter the raw phase signal PHASE generated by its respective sensor 402 to generate a filtered phase signal $\phi_{LPF}$ for the respective sensor. A demultiplexer 608 under the control of selection signal SELECT may route the raw phase signal PHASE for each sensor 402 to its respective low-pass filter 606.

A signal detection block 610, which may be implemented by DSP 432 or other hardware of a processing IC 412, may detect whether a valid signal is detected by a sensor, which may be indicated by ΔPHASE≠0. Sensitivity equalization performed in resonant sensing system 112D may only be possible in the absence of an actual, valid signal from sensors 402. Accordingly, signal detection block 610 may disable low-pass filters 606 and gain computation block 614 when a valid signal is detected.

As shown in FIG. 6, a combiner 612A may subtract a resonant phase $\phi_{res}$ for reference sensor 402C from a resonant phase $\phi_{res}$ for first-channel sensor 402A to generate a phase difference $\Delta\phi_{res}$ for first-channel sensor 402A, and a combiner 612B may subtract a resonant phase $\phi_{res}$ for reference sensor 402C from a resonant phase $\phi_{res}$ for second-channel sensor 402B to generate a phase difference $\Delta\phi_{res}$ for second-channel sensor 402B. Such resonant phases $\phi_{res}$ may be determined apriori and stored (e.g., in a memory or other computer-readable medium accessible to DSP 432 or other hardware of a processing IC 412). The difference of resonance phase for each of first-channel sensor 402A and second-channel sensor 402B with respect to reference sensor 402C may be received by gain computation block 614. Combiners 612A and 612B may be implemented by DSP 432 or other hardware of a processing IC 412.

Gain computation block 614, which may be implemented by DSP 432 or other hardware of a processing IC 412, may, based on the various signals it receives from low-pass filters 606 and combiners 612, calculate normalization factors, in the form of gain correction factors $K_{1norm}$ and $K_{2norm}$, which may be used to perform sensitivity equalization for each of first-channel sensor 402A and second-channel sensor 402B. A gain correction factor for a sensor x may be calculated in accordance with:

$$K_{xnorm} = \frac{\phi_{LPF}(x) - \phi_{LPF}(REF) - \text{OFFSET}(x)}{\Delta\phi_{res}(x)}$$

where $\phi_{LPF}(x)$ is the filtered phase signal $\phi_{LPF}$ for such sensor x, $\phi_{LPF}(REF)$ is the filtered phase signal $\phi_{LPF}$ for reference sensor 402C, OFFSET(x) is an initial difference between phase values of a given sensor x with respect to reference sensor 402C for such sensor x, and $\Delta\phi_{res}(x)$ is the phase difference $\Delta\phi_{res}$ for such sensor x.

Based on selection signal SELECT, multiplexer 616, which may be implemented by DSP 432 or other hardware of a processing IC 412, may communicate the gain correction factor $K_{norm}$ for the selected sensor 402 to normalization block 618, while multiplexer 620, which may be implemented by DSP 432 or other hardware of a processing IC 412, may communicate an inverse estimated quality factor $$\frac{1}{Q_{est}^a}$$

(wherein a may be any suitable positive exponent) for the selected sensor 402 to normalization block 618. Although inverse estimated quality factor is given as $$\text{``}\frac{1}{Q_{est}^a}\text{,''}$$

it is understood that an inverse estimated quality factor may be any suitable function which is inversely proportional to estimated quality factor $Q_{est}$.

Figure 7:
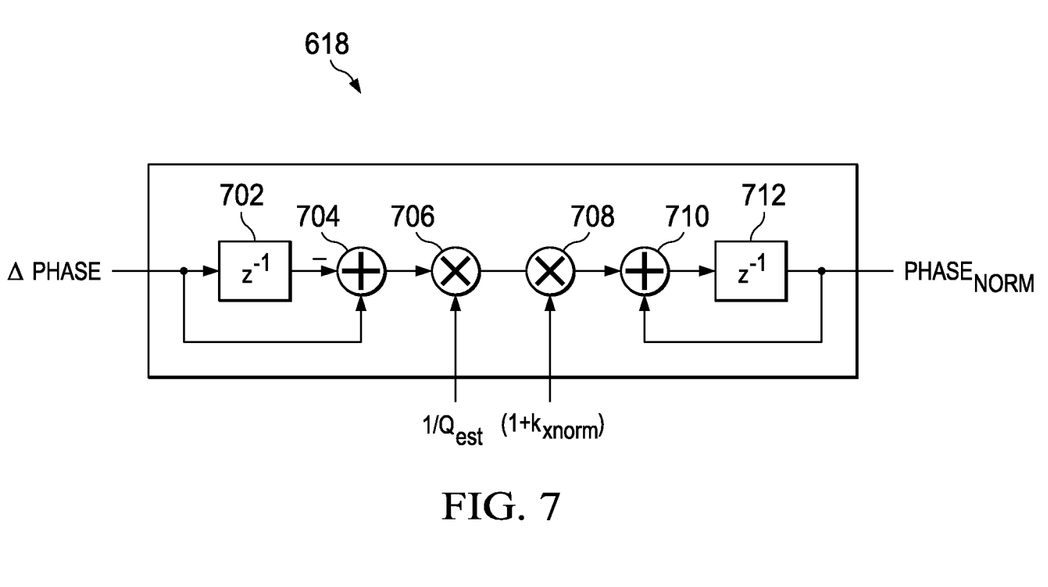
FIG. 7 illustrates a diagram of selected components of an example normalization block, in accordance with embodiments of the present disclosure.

Normalization block 618, which may be implemented by DSP 432 or other hardware of a processing IC 412, may receive the gain correction factor $K_{norm}$ for the selected sensor 402 and the inverse estimated quality factor $$\frac{1}{Q_{est}^a}$$

for the selected sensor 402 and, based thereon, generate a corrected, normalized phase signal $PHASE_{NORM}$ for the selected sensor 402, wherein the normalized phase signal $PHASE_{NORM}$ is corrected for sensor drift. As shown in FIG. 7, normalization block 618 may include a delay element 702 and a combiner 704 which may calculate a difference between the two most recent samples of phase change signal ΔPHASE for the selected sensor 402. Multipliers 706 and 708 may multiply the output of combiner 704 by inverse estimated quality factor $$\frac{1}{Q_{est}^a}$$

for the selected sensor 402 and gain correction factor $K_{norm}$ for the selected sensor 402. The result of such multiplication may be integrated by combiner 710 and delay element 712 to generate normalized phase signal $PHASE_{NORM}$ for the selected sensor 402.

Summarizing FIGS. 6 and 7, in operation, gain computation block 614 subtracts the measured raw phase signals PHASE for two sensors 402 which multiplex the same phase detection circuitry. Sensor drift induced by a driving frequency and a phase drift in the phase detector is likely to be common between both sensors 402. However, a drift induced by change in respective quality factors for the two sensors 402 is likely not common between both sensors 402. Accordingly, any phase difference between the two sensors 402 (in the absence of a valid signal) is a function of the difference in sensitivities of the two sensors 402.

In implementation, it may be desirable that sensors 402 should be located such that sensors 402 do not typically experience the same drifts. Accordingly, if all sensors 402 were to experience the same drift, then no problem may exist. However, to the extent that one sensor 402 experiences a larger drift than another, a difference in phase between the two sensors 402 may be a function of an amount of relative drift between the two sensors.

Although the foregoing contemplates measurement of sensitivity drift of multiple sensors 402 relative to a reference sensor 402C, whose sensitivity is assumed not to drift, in some embodiments, the methods and systems described above may be applied to multiple sensor systems without use of a reference sensor, in which case, gain computation block 614 and normalization block 618 may quantify and correct for relative sensitivity drift among such multiple sensors (i.e., one of the multiple sensors may be in essence used as a reference sensor).

A resonant phase $\phi_{res}$ for a sensor 402 may be dependent on a quality factor of such sensor 402, as follows:

$$\phi_{res} = \tan^{-1}\left(\frac{1}{Q}\right)$$

Thus, a drift in sensor quality factor (i.e., sensitivity) may cause resonant phase to drift. A drift in resonant phase may be related to a drift in quality factor as follows:

$$\frac{\phi_1 - \phi_2}{\phi_1} \approx \frac{Q_2 - Q_1}{Q_2}$$

Wherein $Q_1$ is a nominal quality factor of a sensor 402, $Q_2$ is the post-drift quality factor, $\phi_1$ is a nominal phase at resonance, and $\phi_2$ is the phase of the sensor post-drift.

In operation, a speed of drift detection and correction may depend on a corner frequency of low-pass filters 606. Selection of such corner frequency may consider tradeoffs between speed and accuracy. A lower-corner frequency would filter out more noise and provide a more accurate estimate of sensor drift at the cost of additional delay in determining actual drift, due to the larger settling time of low-pass filters with lower corner frequencies. A higher corner frequency may filter out less noise, but may respond faster to drifts in phase caused by a drift in quality factor. Thus, depending on end use, the corner frequencies of low-pass filters 606 may be optimized.

Although the foregoing contemplates use of sensors to measure phase and provide for correction of phase based on a drift in sensor sensitivity, in some embodiments, sensors may measure a characteristic other than phase (e.g., amplitude, frequency) and correct for such other characteristic based on a drift in sensor sensitivity to such characteristic.

The systems and methods described herein may overcome some or all of the limitations of existing approaches for detecting drift based on change in quality factor. For example, the systems and methods herein may isolate drifts of sensors 402 from drifts induced by phase detector 602. As another example, the systems and methods herein may operate with lower power than existing approaches, and thus the present disclosure may not require frequency probing of sensors 402. As a further example, the systems and methods herein may operate with higher accuracy than existing approaches, which may be required to average quality factor measurements over a long period of time in order to achieve the same level of accuracy as the present disclosure.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
    a plurality of resistive-inductive-capacitive sensors, each resistive-inductive-capacitive sensor configured to sense a physical pressure that modifies a resonant frequency of such resistive-inductive-capacitive sensor; and
    a calibration subsystem configured to perform a calibration comprising:
    comparing the resonant frequency from each of at least two sensors of the plurality of resistive-inductive-capacitive sensors to determine a sensitivity drift of at least one sensor of the plurality of resistive-inductive-capacitive sensors;
    based on the measured characteristics of the at least two sensors and stored reference characteristics for the at least two sensors, calculating a gain correction factor for the at least one sensor;
    based on the gain correction factor for the at least one sensor and an estimated quality factor for the at least one sensor, calculating a normalization factor for the at least one sensor; and
    applying the normalization factor to the measured characteristic of the at least one sensor to equalize sensitivity of the plurality of resistive-inductive-capacitive sensors relative to each other.

2. The system of claim 1, wherein one sensor of the at least two sensors comprises a reference sensor having a known configuration.

3. The system of claim 1, wherein the calibration is configured to perform the calibration only in the absence of a valid measured signal from the plurality of resistive-inductive-capacitive sensors.

4. The system of claim 1, wherein the calibration further comprises:
    low-pass filtering the measured characteristics of the at least two sensors to remove noise; and
    optimizing a corner frequency for the low-pass filtering in accordance with a desired response time.

5. A method for performing a calibration in a system having a plurality of resistive-inductive-capacitive sensors configured to sense a physical pressure that modifies a resonant frequency of such resistive-inductive-capacitive sensor, the method comprising:
    comparing the resonant frequency from each of at least two sensors of the plurality of resistive-inductive-capacitive sensors to determine a sensitivity drift of at least one sensor of the plurality of resistive-inductive-capacitive sensors;
    based on the measured characteristics of the at least two sensors and stored reference characteristics for the at least two sensors, calculating a gain correction factor for the at least one sensor;
    based on the gain correction factor for the at least one sensor and an estimated quality factor for the at least one sensor, calculating a normalization factor for the at least one sensor; and
    applying the normalization factor to the measured characteristic of the at least one sensor to equalize sensitivity of the plurality of resistive-inductive-capacitive sensors relative to each other.

6. The method of claim 5, wherein one sensor of the at least two sensors comprises a reference sensor having a known configuration.

7. The method of claim 5, wherein the method performs the calibration only in the absence of a valid measured signal from the plurality of sensors.

8. The method of claim 5, wherein the method of calibration further comprises:
    low-pass filtering the measured characteristics of the at least two sensors to remove noise; and
    optimizing a corner frequency for the low-pass filtering in accordance with a desired response time.

9. The method of claim 5, wherein the physical pressure is a function of an interaction of a person with a human-machine interface of an electronic device.

10. The system of claim 1, wherein the physical pressure is a function of an interaction of a person with a human-machine interface of an electronic device.

* * * * *